US009304881B2

(12) United States Patent
Quennesson et al.

(10) Patent No.: US 9,304,881 B2
(45) Date of Patent: *Apr. 5, 2016

(54) TRACE ROUTING NETWORK (71) Applicant: Mentor Graphics Corporation, Wilsonville, OR (US)

(72) Inventors: Cyril Quennesson, Antony (FR); Pamphile Koumou, Villepreux (FR)

(73) Assignee: Mentor Graphics Corporation, Wilsonville, OR (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/055,182

(22) Filed: Oct. 16, 2013

(65) Prior Publication Data
US 2014/0046650 A1    Feb. 13, 2014

Related U.S. Application Data (63) Continuation of application No. 13/480,426, filed on May 24, 2012, now Pat. No. 8,566,068, and a continuation of application No. 12/136,589, filed on Jun. 10, 2008, now abandoned.

(60) Provisional application No. 61/044,881, filed on Apr. 14, 2008.

(51) Int. Cl.
*G06F 9/445* (2006.01)
*G06F 11/00* (2006.01)
*G06F 11/26* (2006.01)
*G06F 17/50* (2006.01)

(52) U.S. Cl.
CPC .................................. *G06F 11/261* (2013.01)

(58) Field of Classification Search
USPC ............. 703/2, 17, 22; 700/95; 257/207, 691; 714/727
See application file for complete search history.

(56) References Cited

U.S. PATENT DOCUMENTS

| 4,215,406 | A | 7/1980 | Gomola et al. |
| 4,216,528 | A | 8/1980 | Robertson |
| 4,227,245 | A | 10/1980 | Edblad et al. |
| 4,389,706 | A | 6/1983 | Gomola et al. |
| 6,445,065 | B1 | 9/2002 | Gheewala et al. |
| 6,617,621 | B1 | 9/2003 | Gheewala et al. |
| 8,032,805 | B1 | 10/2011 | Tabatabaei |
| 8,032,806 | B1 | 10/2011 | Tabatabaei |
| 2003/0212524 | A1 | 11/2003 | Cote et al. |

*Primary Examiner* — Thai Phan
(74) *Attorney, Agent, or Firm* — Banner & Witcoff, Ltd.

(57) ABSTRACT

Hardware emulation produces relevant and irrelevant trace data. Verification of a design under test requires knowledge of the relevant trace data. Data lines are provided to capture trace data from the hardware emulator's logic elements during emulation. The data lines connect the outputs of these logic elements to the inputs of a configurable interconnect circuit. The configurable interconnect circuit is capable of being programmed to select from a plurality of these inputs to connect a number of the data lines to a scan chain or trace data storage circuit. The configurable interconnect circuit can then selectively connect those data lines carrying relevant trace data to a trace data processing circuit. The trace data processing circuit may be a scan chain, analysis device or storage device or other suitable trace data processing device.

20 Claims, 5 Drawing Sheets

TRACE ROUTING NETWORK

RELATED APPLICATIONS

This application is a continuation of U.S. patent application Ser. No. 13/480,426, entitled "Trace Routing Network," filed on May 24, 2012, which in turn claimed priority under 35 U.S.C. §120 to U.S. patent application Ser. No. 12/136,589, entitled "Trace Routing Network," filed on Jun. 10, 2008, which in turn claimed priority under 35 U.S.C. §119 to U.S. Provisional Patent Application No. 61/044,881, entitled "Trace Routing Network," filed on Apr. 14, 2008.

Each of the above-mentioned applications is incorporated entirely herein by reference in its entirety.

FIELD OF THE INVENTION

The invention relates to the field of hardware emulation. More specifically, various implementations of the invention relate to capturing trace data in a hardware emulation environment.

BACKGROUND OF THE INVENTION

Today's sophisticated integrated circuit (IC) designs are rapidly evolving and nearly doubling in size with each generation. In fact, complex designs have nearly exceeded 300 million gates. The complexity of modern designs and the increased use of multiple component blocks integrated into a single device, (forming a "system on chip" (SoC)), have made design verification an essential element in the development cycle. Ultimately, this means that design verification is important to every chip designer, system integrator, and application software developer.

Although the use of pre-packaged designs (sometimes referred to as intellectual property (IP) blocks) and high-performance tools both help the design process by shortening design time, they do not diminish the need to verify the design at the system level, which can consume 60 percent to 70 percent of the design cycle. Additionally, the re-use of intellectual property blocks may cause previously undetected problems to arise when the blocks are combined or integrated into a subsequent design, which may actually increase the need to use verification during the design flow.

Designers can implement a number of verification strategies, including software simulation, simulation acceleration, and rapid prototyping. For system-level verification however, hardware emulation remains a favorable choice over other alternatives due to the superior speed, performance, visibility, flexibility, and accuracy it can provide. For example, hardware emulation can test overall system functionality, subsystem integrity, specification errors, block-to-block interfaces, boundary cases, and asynchronous clock domain crossings.

Prior to using a hardware emulator, the hardware design must be converted or "synthesized" into code that can be used to program the hardware emulator's logic elements. Also, the designs interconnections must be mapped into the hardware emulator. Once the design is synthesized and mapped into the hardware emulator, the design can be "tested" by applying stimuli signals to the hardware emulator and capturing the output from the various logic elements of the hardware emulator. This captured output (known as trace data, visibility data, state data, or user visibility data), is collected from the various elements within the hardware emulator, and provided to the user, processing tools, analysis tools, or storage tools where the data can be used to verify and debug the design under test.

In general, when the design is synthesized and the emulator programmed, less than 50% of the logic elements within the emulator will correspond to the logic gates in the design under test. Occasionally, as little as 30% of the emulator's logic elements will correspond to logic gates within the design under test. As a result, typically only 30% to 50% of the captured trace data is relevant to the verification of the design under test. (The trace data originating from an element within the hardware emulator that corresponds to a logic gate within the design under test will hereafter be referred to as "relevant" trace data. Similarly, the trace data that does not originate from an element within the hardware emulator that corresponds to a logic gate within the design under test is herein referred to as "irrelevant" trace data.)

The specific logic elements within the hardware emulator that correspond to gates within the design under test change each time the hardware emulator is programmed. As a result, the verification engineer does not know beforehand which elements will correspond to gates within the design under test. In a conventional hardware emulator, the typical solution to this would be to capture the trace data from each logic element within the hardware emulator. After which the irrelevant trace data that was captured would typically be bypassed. Bypassing the irrelevant trace data from the hardware emulator requires additional logic elements to be included in the data capture circuitry. These additional logic elements greatly increases the area needed for the data capture circuitry. Additionally, bypassing trace data creates timing issues. Thus there is a desire to reduce the number of logic elements within a data capture circuit for use in a hardware emulation environment, while still providing for a robust reconfigurable computing environment with which to emulate, verify, and debug a hardware design. Additionally, there is a desire to capture the relevant trace data in a hardware emulator without the need to bypass the irrelevant trace data.

SUMMARY OF THE INVENTION

Aspects of the invention relate to capturing and routing trace data within a hardware emulation environment.

In various implementations of the invention, a plurality of data lines are provided to capture trace data from the hardware emulator's logic elements during emulation. The data lines connect the outputs of these logic elements to the inputs of a configurable interconnect circuit. The configurable interconnect circuit is capable of being programmed to select from a plurality of these inputs to connect a number of the data lines to a scan chain or trace data storage circuit.

With some implementation of the invention, the plurality of data lines connecting the outputs of the reconfigurable logic within the hardware emulator are greater than the number of outputs from the configurable interconnect circuit. The configurable interconnect circuit can then selectively connect those data lines carrying relevant trace data to a trace data processing circuit. In some implementations of the invention, the trace data processing circuit is a scan chain. In still other implementations of the invention however, the trace data processing circuit may be another type of data capture device, such as a memory circuit.

These and other features and aspects of the invention will be apparent upon consideration of the following detailed description.

BRIEF DESCRIPTION OF THE DRAWINGS

The present invention will be described by way of illustrative embodiments shown in the accompanying drawings in which like references denote similar elements, and in which.

DETAILED DESCRIPTION OF ILLUSTRATIVE EMBODIMENTS

The Hardware Emulation Environment

Figure 1:
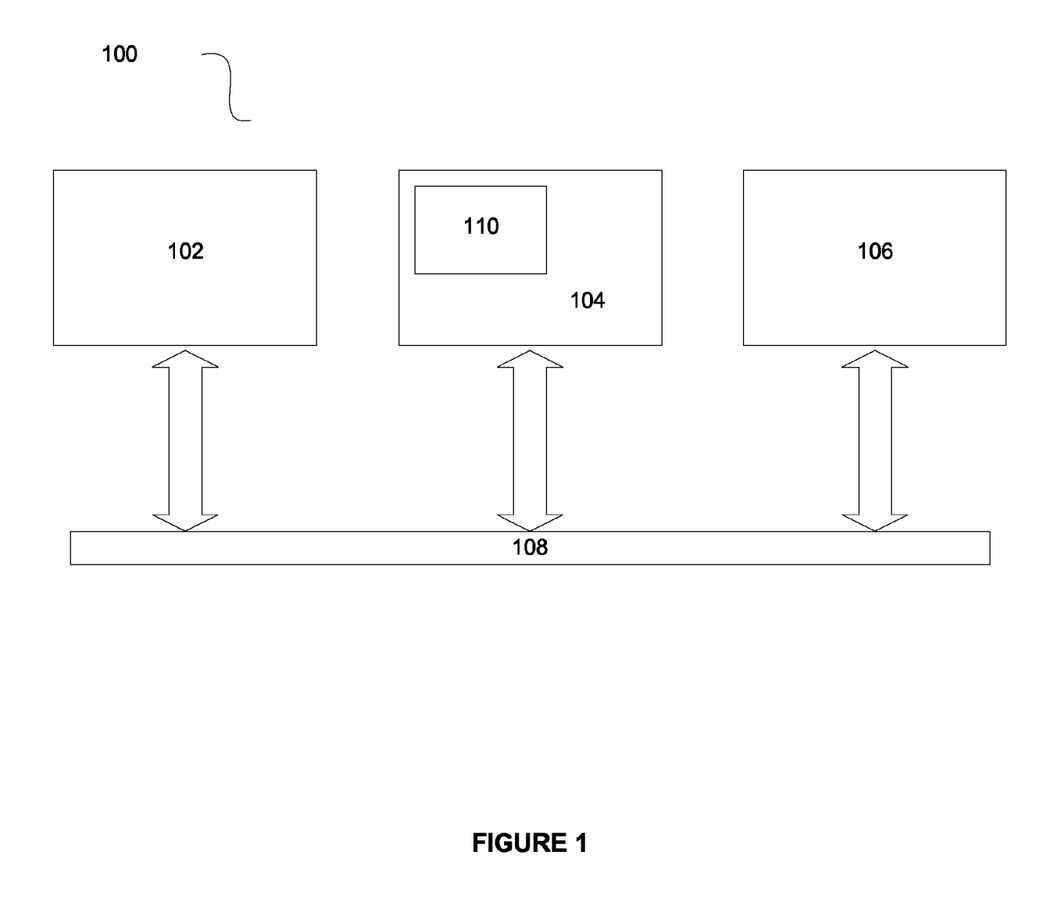
FIG. 1 illustrates a hardware emulation environment.

FIG. 1 illustrates a conventional hardware emulation environment 100, such as the type of hardware emulation environment in which various embodiments of the invention can be implemented. The hardware emulation environment 100 includes a computer system 102, a hardware emulator 104, a test bench 106, and a data bus 108. The computer system 102, the hardware emulator 104, and the test bench 106 are all interconnected via the data bus 108, as shown in FIG. 1.

In various implementations, the computer system 102 is utilized to program the hardware emulator 104 such that the hardware emulator 104 will emulate the logical operation of the design under test 110. In some embodiments, this may involve partitioning a circuit design, such as a very high speed integrated circuit (VHSIC) hardware description file (VHDL), into subsets. These subsets, often called netlists, describe the logical operation of the design as well as the connectivity of the design. The computer system 102 then maps the circuit design, or some portion of the circuit design, into the hardware emulator 104 according to the design description in the netlists.

The computer system 102 may be a standard standalone workstation, or it may be a plurality of computers networked together operating in a parallel fashion. As an example, the computer system 102 could be an x86 based computer running a Unix based operating system with suitable software tools to manipulate a hardware description file. Additionally, the computer system 102 would have the required input and output ports to communicate with the hardware emulator 104 and the test bench 106.

Once the computer system 102 maps the circuit design into the hardware emulator 104, the hardware emulator 104 will operate as the design under test 110 during emulation. The test bench 106 then is used to apply stimuli signals to the hardware emulator 104. When activated with stimuli signals, the hardware emulator 104 will mimic the logical operation of the design under test 110 and process the stimuli signals, generating state data. This state data is then captured and conveyed to the computer system 102 via the data bus 108. The computer system 102 can use this data to validate the design under test 110. During validation, if the output is not as expected or desired, then changes to the design can be made and the emulation process repeated. This basic design flow describes in general how a hardware emulation environment 100 could be implemented with the teachings of the invention and used to emulate a circuit design. As used herein, the state data generated by the logical elements within the hardware emulator 104 is referred to as either trace data or state data.

In various implementations of hardware emulation environment 100, the test bench 106 is controlled by the computer system 102. In the alternative, the test bench 106 may be controlled by a test file stored on a computer readable medium accessible by the test bench 106. Additionally, the test bench 106 could be integrated into the computer system 102, as for example, a custom computer workstation designed for use with the hardware emulation circuitry 104, which includes data acquisition and signal generation hardware. In still other implementations, the hardware emulator 104 may be programmed via a hardware description file stored on a computer readable medium, or transferred via computer communication means.

With some examples of the invention, the hardware emulation environment 100 may be used as a co-simulation system. In a co-simulation system, the gate emulation of the design under test takes place on the hardware emulator 104, while the computer system 102 or other computer system, simulates a software program "running" on the hardware emulator 104. A co-simulation system is useful to test operating system software for use with the design under test 110 or to test other software which will work in conjunction with the design under test 110.

In various implementations of the invention, the state data generated during emulation is output to test equipment, such as a data analyzer or custom workstation. Additionally, the state data could be output to a memory storage device for later recall and usage. In some implementations, the computer system 102 receives the state data generated by the hardware emulator 104. In still other implementations, the state data is received by an output device such as a computer monitor or printer where the data is made available to the user.

A Conventional Hardware Emulator Circuit

Figure 2:
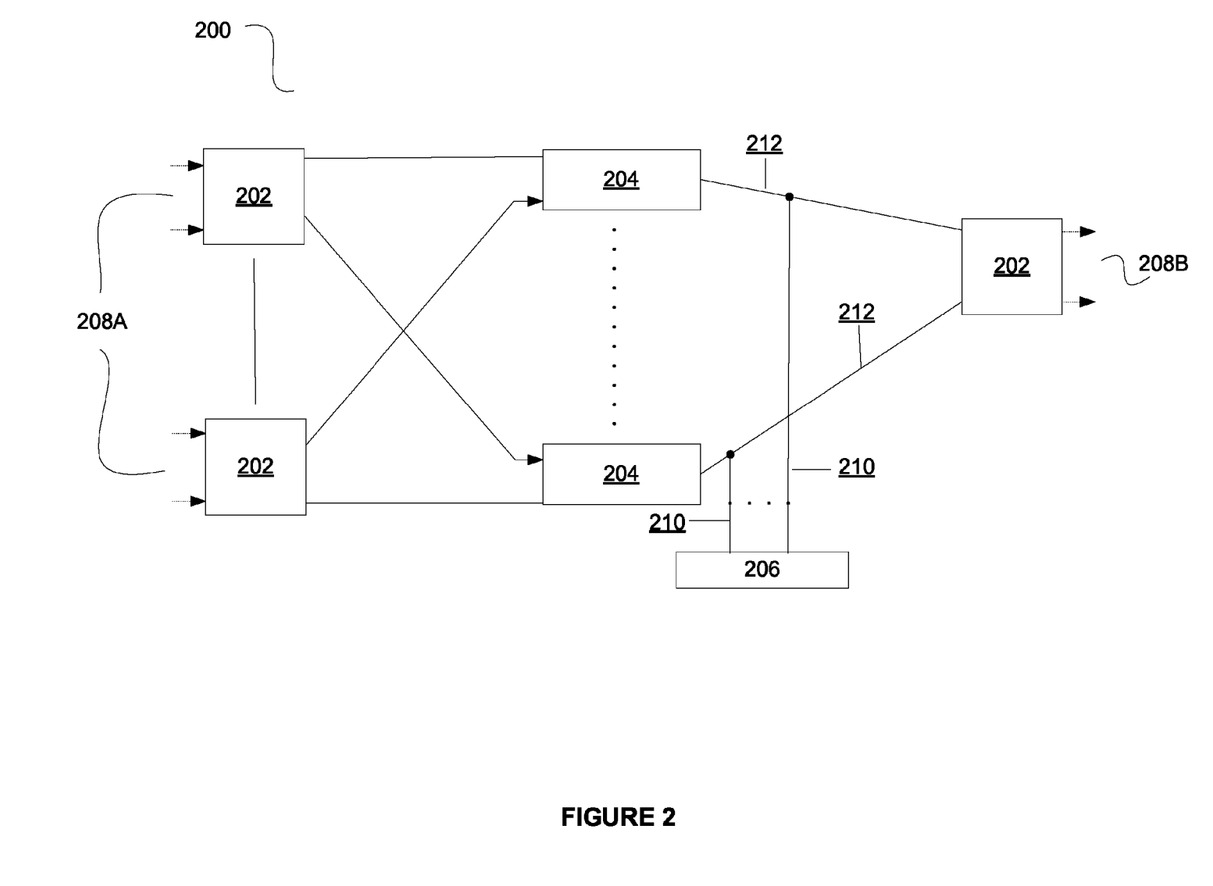
FIG. 2 illustrates a conventional hardware emulator circuit.

FIG. 2 illustrates an example of a conventional hardware emulator circuit 200. In some implementations, the hardware emulator circuit 200 may be used to make up some portion of the hardware emulator 104 used in the hardware emulation environment 100. The hardware emulator circuit 200 contains routing networks 202, configurable physical blocks (CPBs) 204, and a trace scan chain 206. The hardware emulator circuit 200 is connected to the data bus 108 of the hardware emulation environment 100 through signal lines 208. The input signal lines 208a are provided so that, during operation, stimuli signals from the test bench 106 or other input may be conveyed to the hardware emulator circuit 200. The output signal lines 208b are provided so that, during operation, trace data may be conveyed from the hardware emulator circuit 200 to other circuitry within the hardware emulation environment 100, for example another hardware emulator circuit 200. The routing networks 202 and the configurable physical blocks 204 are both programmable. In general, their programming is based on the netlists corresponding to the design under test. Once programmed, the routing networks 202 form interconnections between the signal lines 208 and the configurable physical blocks 204. The configurable physical blocks 204 are programmed to perform one of a number of possible logic functions. Programming the routing networks 202 and the configurable physical blocks 204 in this manner allows the hardware emulator 104 to take on the behavior of some portion of the design under test 110.

As explained previously, verification of the design under test 110 requires knowledge of the state signals from the configurable physical blocks 204. To facilitate this, in a conventional hardware emulator circuit 200, a plurality of data lines 210 typically are provided for capturing the state signals from the configurable physical blocks 204 during emulation. Each of the data lines 210 are connected to a corresponding output line 212 of the configurable physical blocks 204. The data lines 210 are further connected to the trace scan chain 206, as shown in FIG. 2. As explained above, during any given emulation cycle, only 30% to 50% of the configurable physical blocks 204 will correspond to gates with the design under test 110. As a result, not all of the configurable physical blocks 204 contain relevant state data during each emulation cycle. Therefore the scan chain 206 will usually be configured to bypass the irrelevant state data, as will be explained in detail below.

Scan Chain Operation

Figure 3:
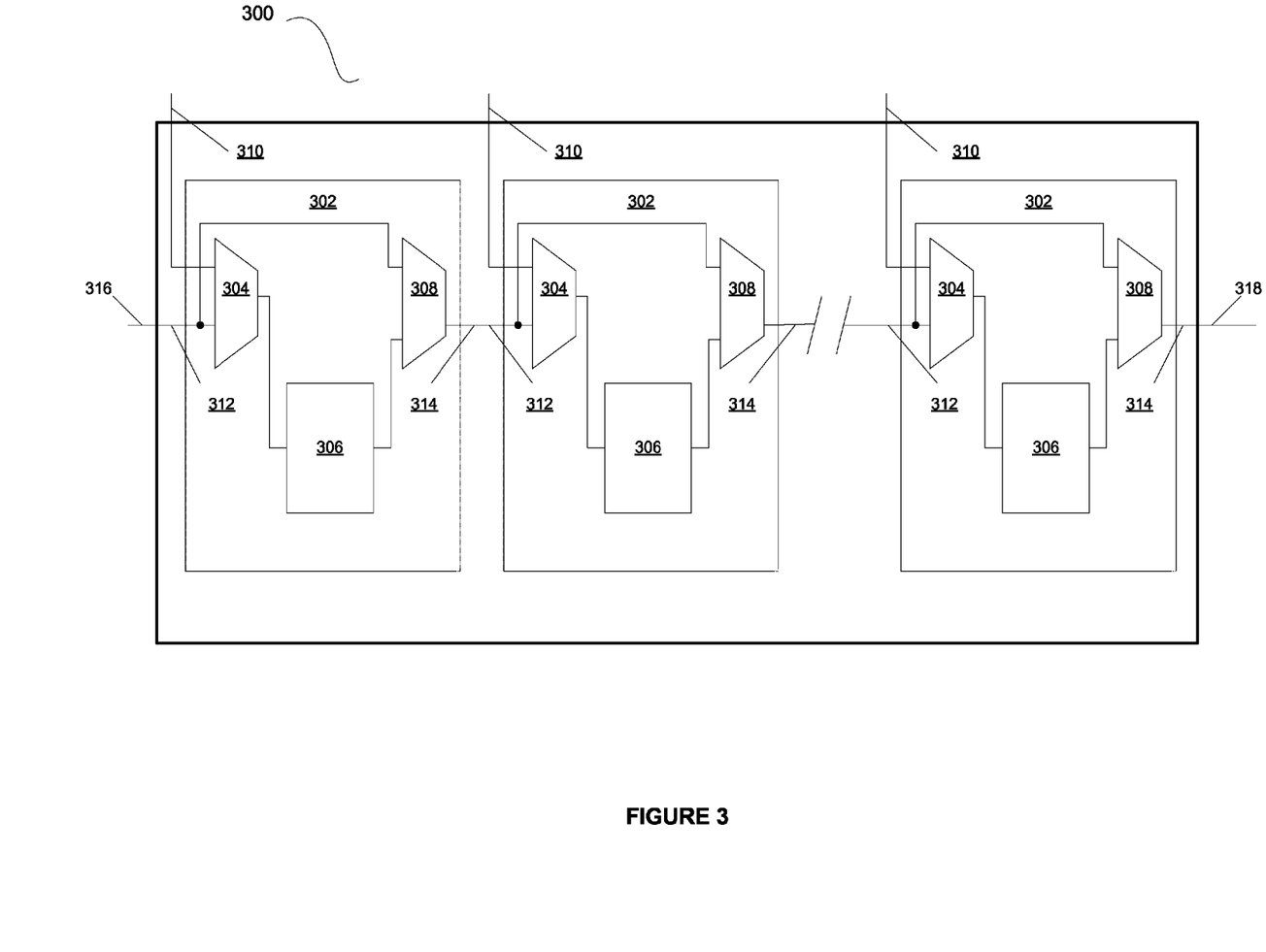
FIG. 3 illustrates a conventional scan chain circuit.

FIG. 3 illustrates a conventional scan chain circuit 300 that may make up some portion of a conventional scan chain 206. The scan chain circuit 300 typically contains a scan chain segment 302 that corresponds to a configurable physical block 204 in the hardware emulator circuit 200. (Typically a scan chain 206 will have a scan chain segment 302 for every configurable physical block 204 in the associated hardware emulation circuit 200.) As seen in this figure, a scan chain segment 302 includes an input data selector 304, a memory module 306 and a bypass data selector 308, connected as shown. Each of the scan chain segments 302 has a first scan segment input line 310 and a second scan segment input line 312 as well as a scan segment output line 314.

State signals from the configurable physical blocks 204 are captured by the data lines 210 as described above, and conveyed to the input data selectors 304 of the corresponding scan chain segments 302 in parallel. More particularly, the first scan segment input lines 310 of the scan chain 300 are connected to the data lines 210 of the hardware emulator 200. Additionally, the scan chain segments 302 within the scan chain 300 are cascaded in series by connecting the scan segment output line 314 of one scan chain segment 302 to the second scan segment input line 312 of a subsequent scan chain segment 302, as illustrated in FIG. 3. When the scan chain segments are cascaded in the manner described, the second scan segment input line 312 from the first scan chain segment 302 in the series will not be connected to another scan chain segment 302. Accordingly, this scan segment input line 312 is used as a scan data input 316. Additionally, the scan segment output line 314 from the last scan chain segment 302 in the series will not be connected to anther scan chain segment 302. Accordingly, this scan segment output 314 is used as a scan data output 318.

In the illustrated implementation, the scan chain 300 operates as follows. When state data signals from the configurable physical blocks 204 are desired for verification, a capture operation is enabled. Enabling a capture operation causes the input data selectors 304 to connect the first data inputs 310 to the memory module 306. Given that the first data inputs 310 are connected to the data lines 210, the state signals originating from the configurable physical blocks 204 will be available at the memory modules 306 within the scan chain 300. As described previously, generally 50% to 70% of the configurable physical blocks 204 produce irrelevant state data. As a result, 50% to 70% of the memory modules 306 will store irrelevant state data. To correct this, the bypass data selectors 308 corresponding to memory modules 306 that stored irrelevant state data are enabled. Enabling a bypass data selector 308 causes the second scan segment input 312 to be connected to the scan segment output 314, rather than the memory module 306. Once a capture has been enabled, the memory modules 306 have stored the corresponding state data, and the memory modules 306 storing irrelevant data bypassed, the relevant trace data is typically shifted out from the scan chain 300 in series on the data output 318. Additionally, a bit or series of bits can be shifted into the scan chain 300 from the scan data input 316 to indicate when the scan data has been successfully shifted out of the scan chain 300.

Trace Routing For Scan

Figure 4:
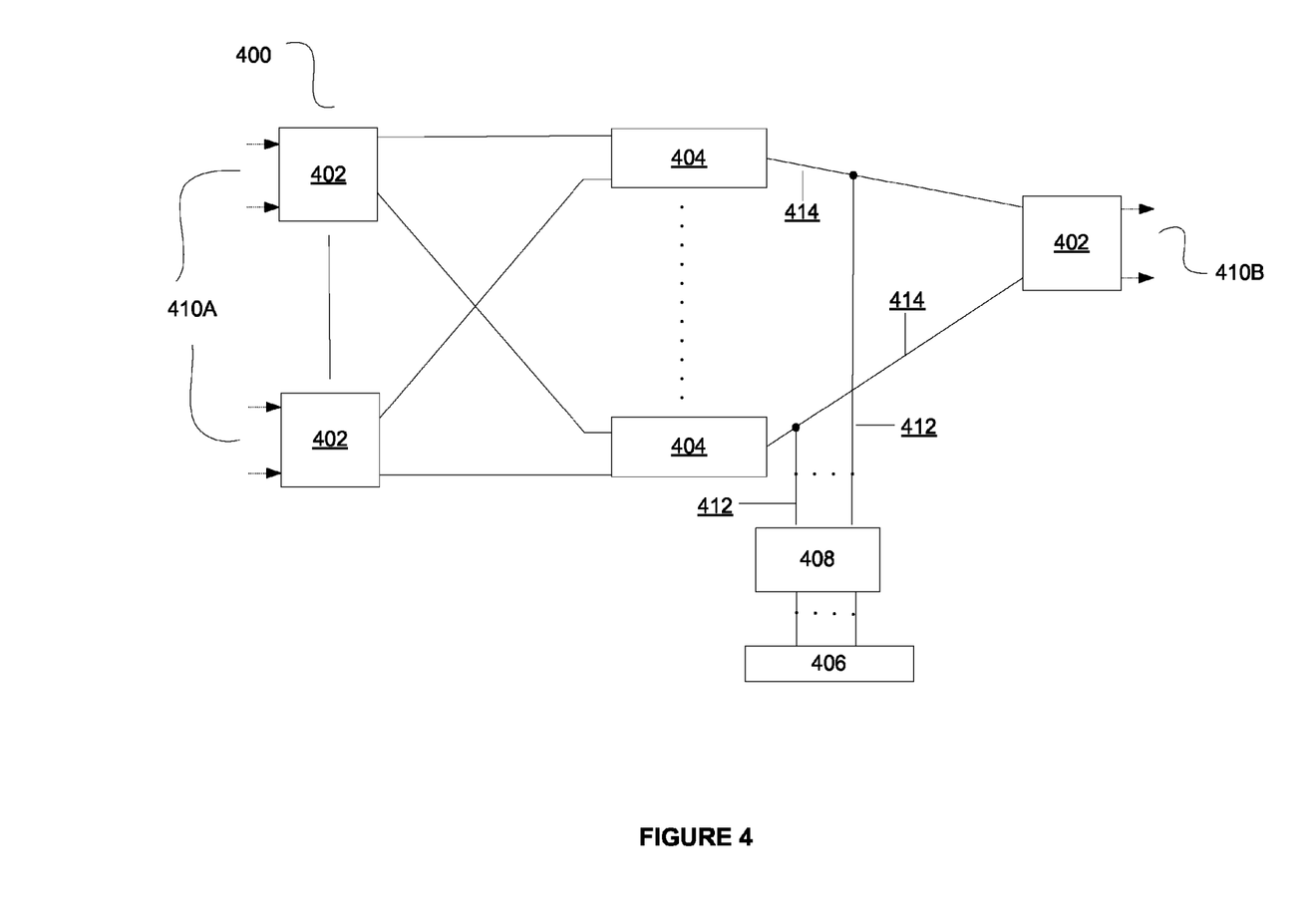
FIG. 4 illustrates exemplary hardware emulator circuitry in accordance with at least one implementation of the invention.

FIG. 4 illustrates a hardware emulator circuit 400, which may be implemented according to various embodiments of the invention. As will be discussed in more detail below, the hardware emulator circuit 400 allows the scan chain to be operated without having to bypass irrelevant state data. Additionally, as will be apparent from the description, all or some portion of the hardware emulator 104 may be implemented using the hardware emulator circuit 400. The hardware emulator circuit 400 contains routing networks 402, configurable physical blocks (CPBs) 404, a scan chain circuit 406, and a configurable interconnect circuit 408. The routing networks 402 may be implemented using a crossbar network or other switching device.

The hardware emulator circuit 400 is connected to the data bus 108 of the hardware emulation environment 100 through signal lines 410. The input signal lines 410a are provided so that during operation, stimuli signals, typically from the test bench 106 or other input device, may be conveyed to the hardware emulator circuit 400. The output signal lines 410b are provided so that during operation, trace data may be conveyed from the hardware emulator circuit 400 to other circuitry within the hardware emulation environment 100. Such as another hardware emulator circuit 400.

The routing networks 402, the configurable physical blocks 404 and the configurable interconnect circuit 408 are all programmable. Although not shown in the figures, these programmable components of the circuit have programming lines that facilitate programming. For example the programming lines could be connected between the programmable components and the computer system 102. Typically, programming of the routing networks 402 and the configurable physical blocks 404 is based on the netlists corresponding to the design under test. Once programmed, the routing networks 402 form interconnections between the signal lines 410 and the configurable physical blocks 404. The configurable physical blocks 404 are programmed to perform one of a number of possible logic functions. Once programmed, the routing networks 402 and the configurable physical blocks 404 will take on or emulate the behavior of some portion of the design under test 110.

As described in detail above, verification of the design under test 110 requires knowledge of the state signals from the configurable physical blocks 404. To facilitate this, a plurality of data lines 412 are provided for capturing the state signals from the configurable physical blocks 404 during emulation. Each of the data lines 412 is connected to a corresponding data capture output 414 of a configurable physical block 404. The data lines 412 are further connected to the inputs of the configurable interconnect circuit 408, as shown in FIG. 4. The outputs from the configurable interconnect circuit 408 are connected to the scan chain circuit 406. The configurable interconnect circuit 408 is programmable to selectively connect at least one of the data lines 412 to the scan chain circuit 406.

In various implementations of the invention, the configurable physical blocks 404 are composed of a field programmable gate array and a flip-flop. This allows the configurable physical block 404 to be programmed to perform a number of different logic functions, and to store the state output until a subsequent emulation cycle. In other implementations of the invention, the configurable physical blocks 404 may be application-specific integrated circuits (ASICs). These application-specific integrated circuits can either be custom designed for use in the hardware emulator circuit 400, or commercially available off-the shelf devices. Additionally, in various examples of the invention, the configurable interconnect circuits 408 may be implemented using a crossbar network. The crossbar network would be programmed so that those configurable physical blocks 404 producing relevant state data are connected to the scan chain circuit 406, while those producing irrelevant state data would not. In still other implementations of the invention, the configurable interconnect circuit 408 may be implemented using a multiplexor or other switching device.

With various implementations of the invention, the hardware emulator circuit 400 of FIG. 4 is operated as follows. The hardware emulator circuit 400; including routing networks 402, configurable physical blocks 404, and configurable interconnect circuit 408, is programmed by the computer system 102 according to the netlists, or some portion thereof, describing the design under test. Programming of the hardware emulator circuit 400 maps the interconnections and logic functions of some portion of the design under test 110 into the hardware emulator circuit 400. Additionally, programming of the configurable interconnect circuit 408 maps the data lines 412 corresponding to configurable physical blocks 404 that produce relevant state data to the scan chain 406. Stimuli signals are then be provided to the hardware emulator circuit 400 by the test bench 106 via signal lines 410. In response to the stimuli signals, the hardware emulator circuit 400 emulates some portion of the design under test 110, and the configurable physical blocks 404 produce state signals. These state signals will be captured by the data capture outputs 414. The data lines then convey the state signals to the configurable interconnect circuit 408. Due to the interconnections made by the configurable interconnect circuit 408 during programming, the relevant state signals will be conveyed to the scan chain circuit 406, while the irrelevant state signals will not.

More particularly, suppose for example the hardware emulator circuit 400 included 32 configurable physical blocks 404. As detailed above, between 30% and 50% of the configurable physical blocks 404 contain relevant state data at any one time. In a typical implementation there may be 16 configurable physical blocks 404 that would produce relevant state data during any given emulation cycle. These 16 configurable physical blocks 404 that will produce relevant state data are those configurable physical blocks 404 whose associated data lines 412 are mapped to the trace scan chain 406 by the configurable interconnect circuit 408. Programming the configurable interconnect circuit 408 in this manner allows the hardware emulator circuit to be operated as described above.

Bypassless Scan Chain Operation

Figure 5:
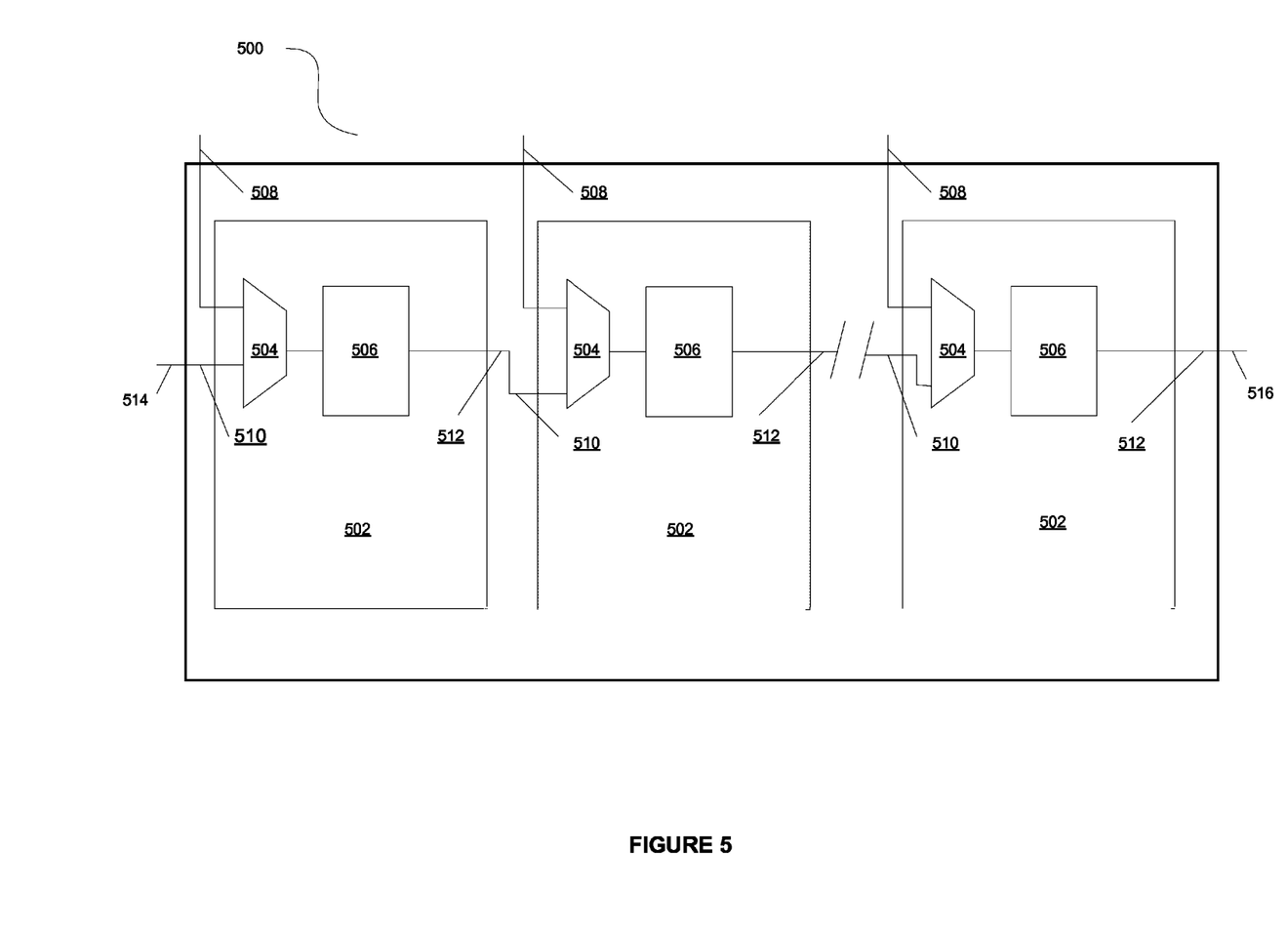
FIG. 5 illustrates an exemplary trace scan chain in accordance with at least one implementation of the invention.

FIG. 5 illustrates a scan chain circuit 500 that may be implemented according to various examples of the invention. The scan chain circuit 500 may be used to implement a portion of the scan chain 406 in the hardware emulator circuit 400. The scan chain circuit 500 contains a plurality of scan chain segments 502. Each of the scan chain segments 502 within the scan chain circuit 500 includes an input data selector 504 and a memory module 506 connected as shown. Additionally, each of the scan chain segments 502 has a first scan segment input 508 and a second scan segment input 510, as well as a scan segment output 512. The first scan segment inputs 508 of the scan chain circuit 500 are connected to the outputs of the configurable interconnect circuit 408. Additionally, the scan chain segments 502 within the scan chain circuit 500 are cascaded in series by connecting the scan segment output 512 of one scan chain segment 502 to the second scan segment input 510 of another scan chain segment 502, as illustrated in FIG. 5. Additionally, the scan chain 506 contains a data input line 514 and a data output line 516. The data input line 514 is connected to the second scan segment input 510 of the first scan chain segment 502 in the series. The data output line 516 is connected to the scan segment output 512 of the last scan chain segment 502 in the series. In various implementations of the invention, the input data selector 504 is a multiplexor and the memory module 506 is a flip-flop.

In various implementations of the invention, the scan chain circuit 500 operates as follows. As explained above, the configurable interconnect circuit 408 is programmed such that only the relevant state data is available to the scan chain circuit 500. A scan capture is initiated by enabling the input data selectors 504. When the input data selectors 504 are enabled, the first scan segment lines 508 are connected to the memory modules 506. The memory modules 506 then store the state data available on the first scan segment input lines 508. Once a capture has been enabled and the memory modules have stored the corresponding state data, the trace data is shifted out from the scan data output 516 in series. Additionally, a bit or series of bits can be shifted into the scan chain 500 from the scan data input 514 to indicate when the scan data has been successfully shifted out of the scan chain circuit 500.

In various implementations of the invention, there may be an equal number of scan chain segments 502 within the scan chain circuit 500 as there are configurable physical blocks 404 within the hardware emulator circuit 104. Accordingly, the configurable interconnect circuit 408 would typically have the same number of inputs as outputs. In other implementations of the invention, there are fewer scan chain segments 502 than configurable physical blocks 404. Accordingly, the configurable interconnect circuit would typically have more inputs than outputs. For example, a simple hardware emulation circuit 400 could be provided with 32 configurable physical blocks 404. As explained previously, less than 50% of the configurable physical blocks will produce relevant state data at any given time. As a result, only 16 scan chain segments 502 may typically be provided in the scan chain circuit 500.

A hardware emulation environment 100 provided with a hardware emulation circuit 400 implemented as some portion of the hardware emulator 104, according to various examples and implementations of the invention, provides the benefit of filtering out the irrelevant trace data prior to it being received by the scan chain 406. This allows a scan chain 406 with reduced area to be provided. In addition timing issues associated with bypassing state data can be avoided. The reduction in feature size and removal of the need to bypass is increased as the size of the hardware emulator 104 is increased. This allows a larger more powerful hardware emulator to be provided, which can emulate more complex designs quicker without the typical issues associated with previous hardware emulators.

CONCLUSION

A hardware emulation environment is taught, including a hardware emulator with a configurable interconnect circuit whereby trace data captured from the hardware emulator can be conveyed to a scan chain and communicated to the user or other means for validating the design under test.

Although certain devices and methods have been described above in terms of the illustrative embodiments, the person of ordinary skill in the art will recognize that other embodiments, examples, substitutions, modification and alterations are possible.

What is claimed is:

1. A hardware emulator apparatus, comprising:
a configurable interconnect circuit configured to, dependent on an emulation cycle, selectively connect one or more sets of data lines from data capture output connections of at least one configurable physical block to one or more scan chain input lines.

2. The hardware emulator apparatus of claim 1, wherein hardware emulator apparatus comprises the at least one configurable physical block, and wherein the at least one configurable physical block comprises:
a field programmable gate array; and
a flip-flop.

3. The hardware emulator apparatus of claim 1, further comprising a scan chain that is configured to receive the one or more scan chain input lines.

4. The hardware emulator apparatus of claim 3, wherein the scan chain comprises:
a plurality of scan chain segments, wherein each of the plurality of scan chain segments includes a memory circuit and an input selector circuit;
wherein the memory circuit of a first scan chain segment is directly connected to the input selector circuit of a second scan segment.

5. The hardware emulator apparatus of claim 4, wherein:
the memory circuit of each of the plurality of scan chain segments includes a flip-flop; and
the input selector circuit of each of the plurality of scan chain segments includes a multiplexor.

6. The hardware emulator apparatus of claim 3, wherein there are a greater number of the data capture output connections than the scan chain is capable of receiving from the configurable interconnection circuit.

7. The hardware emulator apparatus of claim 1, wherein the configurable interconnect circuit is a switching circuit with interconnections that were programmed during programming of the hardware emulator apparatus such that only data lines having relevant state data during a particular emulation cycle are connected to the one or more scan chain input lines.

8. The hardware emulator apparatus of claim 7, wherein the configurable interconnect circuit includes a multiplexor.

9. The hardware emulator apparatus of claim 7, wherein the configurable interconnect circuit includes a crossbar network.

10. The hardware emulator apparatus of claim 9, wherein there are more of the data capture output connections than of the one or more scan chain inputs.

11. A hardware emulation environment, comprising:
a data bus;
a computing system connected to the data bus; and
a hardware emulator connected to the data bus, wherein the hardware emulator comprises:
a configurable interconnect circuit configured to, dependent on an emulation cycle, selectively connect one or more sets of data lines from data capture output connections of at least one configurable physical block to one or more scan chain input lines.

12. The hardware emulation environment of claim 11, wherein the configurable interconnect circuit includes a crossbar network.

13. The hardware emulation environment of claim 11, wherein the hardware emulator comprises the at least one configurable physical block, and wherein the at least one configurable physical block comprises:
a field programmable gate array; and
a flip-flop.

14. The hardware emulation environment of claim 11, wherein the hardware emulator comprises a scan chain that comprises the one or more scan chain input lines, and wherein the scan chain further comprises:
a plurality of scan chain segments, wherein each of the plurality of scan chain segments includes a memory circuit and an input selector circuit;
wherein the memory circuit of a first scan chain segment is directly connected to the input selector circuit of a second scan segment.

15. The hardware emulation environment of claim 14, wherein:
the memory circuit of each of the plurality of scan chain segments includes a flop-flop; and
the input selector circuit of each of the plurality of scan chain segments includes a multiplexor.

16. A method, comprising:
programming a hardware emulator, said programming including:
configuring a configurable interconnect circuit to, dependent on an emulation cycle, selectively connect one or more sets of data lines from data capture output connections of at least one configurable physical block to one or more scan chain input lines.

17. The method of claim 16, further comprising:
configuring a scan chain to receive the one or more scan chain input lines.

18. The method of claim 17, wherein there are a greater number of the data capture output connections than the scan chain is capable of receiving from the configurable interconnection circuit.

19. The method of claim 16, wherein the configurable interconnect circuit includes a multiplexor.

20. The method of claim 16, wherein the configurable interconnect circuit includes a crossbar network.

* * * * *